(12) United States Patent
Gupta

(10) Patent No.: US 6,805,892 B2  
(45) Date of Patent: Oct. 19, 2004

(54) PRODUCTION OF LIQUID FOODS WITHOUT OFF-FLAVORS

(76) Inventor: Rajendra P. Gupta, 9 Veery Lane, Ottawa, Ontario (CA), K1J 8X4

( * ) Notice: Subject to any disclaimer, the term of this patent is extended or adjusted under 35 U.S.C. 154(b) by 228 days.

(21) Appl. No.: 10/052,348

(22) Filed: Jan. 22, 2002

(65) Prior Publication Data  
US 2003/0138534 A1 Jul. 24, 2003

(51) Int. Cl.[7] ............................................. A23L 1/20  
(52) U.S. Cl. .................. 426/486; 426/488; 426/634; 426/518  
(58) Field of Search ................. 426/634, 486, 426/488, 518

(56) References Cited

U.S. PATENT DOCUMENTS

| | | | |
|---|---|---|---|
| 3,937,843 A | | 2/1976 | Osaka et al. |
| 3,982,004 A | * | 9/1976 | Obata et al. ............... 426/641 |
| 4,369,198 A | * | 1/1983 | Uchi et al. ............... 426/271 |
| 4,460,613 A | * | 7/1984 | Yang et al. ............... 426/601 |
| 4,744,524 A | | 5/1988 | Gupta |
| 4,915,972 A | | 4/1990 | Gupta et al. ............... 426/598 |
| 5,068,117 A | * | 11/1991 | McCabe ............... 426/511 |
| 6,451,359 B1 | * | 9/2002 | Nsofor ............... 426/46 |

FOREIGN PATENT DOCUMENTS

| | | | |
|---|---|---|---|
| JP | 59-140845 | * | 8/1984 |
| JP | 63-63358 | * | 3/1988 |

* cited by examiner

Primary Examiner—Anthony Weier

(57) ABSTRACT

In a production of liquid food product from protein containing solid food, some enzymes may produce undesirable off-flavor volatiles. Grinding solid food in a liquid under pressure achieves inactivation of enzymes over a wider window of operating temperature than possible in ambient pressure. It also permits proper cooking operation to be performed simultaneously with the grinding. A grinder operated under pressure eliminates certain components and allows the use of come low cost components, such as for making soymilk from soybeans.

15 Claims, 4 Drawing Sheets

PRODUCTION OF LIQUID FOODS WITHOUT OFF-FLAVORS

FIELD OF INVENTION

The invention resides in the field of continuous production of liquid food products from a variety of solid foods such as plant seeds, legumes, etc., which liquid food products contain no substantial objectionable off-flavor volatiles.

BACKGROUND OF INVENTION

To be generally acceptable, the foods need not only be nutritious, functional and economical but also be attractive in color, aroma, taste and texture. Plant protein preparations mainly from legumes and nuts, like soybeans, have unacceptable off-flavor volatiles and score heavily against their positive properties and limit their use. Lipoxygenase enzyme has been recognized as the major cause of off-flavor volatiles in most vegetable protein sources including soybeans, peas and peanuts. Extraction of soymilk from soybeans, for example, involves grinding of soybeans in water. The lipoxygenase enzymes released from soybean catalyses reactions among water, oxygen and lipids. Some of the reaction products give off strong beany off-flavor volatiles.

Existing methods deal with the problem of beany off-flavors by thermally and/or chemically inactivating lipoxygenase enzyme in soybeans prior to or during the grinding operation under ambient pressure. For example, because at temperature above 65° C., the half-lives of the various lipoxygenase enzymes rapidly decrease with increasing temperature, heating soybeans above this temperature effectively inactivates lipoxygenase enzyme. Hot grinding of soybeans performs the desired inactivation of the enzyme. Ground soybean slurry can now be further processed without any further problem of off-flavor generation. However, the thermal inactivation of enzyme causes other proteins in soybeans also to prematurely denature and get attached to the fibers in the beans. The extraction of proteins in water thus becomes difficult and leads to reduced yield and chalky mouth-feel. The latter is caused due to fine fibers getting into the liquid extract.

Control of off-flavor volatiles has also been achieved by eliminating available free oxygen under ambient or reduced pressure during the grinding oDeration. The present inventor's earlier U.S. Pat. No. 4,915,972 Apr. 10, 1990 describes a process for preparing protein foods by disintegrating the seeds such as soybeans, peanuts etc., in an oxygen-free environment, thus preventing lipoxygenase enzyme from producing the off-flavor volatiles. This process dispenses with the enzyme inactivation by heat treatment.

Another U.S. Pat. No. 4,744,524 May 17, 1988 by the present inventor describes an equipment which grinds soybeans in an oxygen-free environment. The equipment further cooks and separates the soybean slurry to extract soymilk which has no beany flavor.

U.S. Pat. No. 3,937,843 Feb. 10, 1976 Osaka et al describes bean-odor-free soy bean product and its production. The patent uses lactic fermentation of soy milk.

FIG. 1 illustrates schematically a system for continuously producing soymilks with prior art. Referring to the figure, a rotary valve or auger 10 regulates the feeding of soybeans from a soybean hopper 12. The soybeans in the hopper may be dry soybeans or may have already been properly soaked. A regulated amount of hot or cold water is added to the soybeans and the mixture is sent to a grinder 14 that grinds soybeans. When hot water is used for grinding and/or steam is injected between the rotary valve 12 and grinder 14, the lipoxygenase enzyme is partly inactivated and controls beany off-flavor. The hopper 12 may also have water feed and level control for airless feeding and grinding of soybeans. A steam mixer 16 is provided to heat the soybean slurry to a preset temperature. A positive displacement pump (PDP) 18 regulates the slurry flow. A holding tube 20 ensures that the soybeans slurry is properly cooked by maintaining the steam-soybeans slurry mixture at the preset temperatures for a preset duration. A vacuum deodorizer 22 removes the volatiles that may be present in the cooked slurry. A back-pressure valve 24 ensures the maintenance of high pressure and high temperature in the holding tube and a low pressure in the vacuum deodorizer. A PDP 26 sends a regulated amount of cooked slurry to an extractor 28 which separates soymilk and fibrous residue. The extractor can be a centrifugal filter, decanter, filter press, or any other separation device. Soymilk 30 with reduced beany off-flavor volatile is pumped with a PDP 32 for packaging or other processing.

FIG. 2 shows schematically an alternative system similar to that shown in FIG. 1. In the figure, an extractor 40 is moved upstream so that the slurry is separated into liquid and fibrous residue, and only the liquid is cooked with steam in the steam mixer 42. The cooked liquid is held under pressure in a holding tube 44 to ensure a proper cooking at a proper temperature before it is led to a vacuum deodorizer 46.

The methods described thus far for continuously producing non-beany flavor soymilk inactivate the lipoxygenase enzyme thermally or by creating oxygen-free grinding environment. They involve multiple well-controlled steps before soymilk is extracted and ready for further processing. Any departure from the limited range of the operating parameters leads to the degradation of the quality and yield of soymilk. As a result, existing methods are either capital or manpower intensive, and are not easy to adapt to small-scale continuous production with low cost equipment.

SUMMARY OF INVENTION

In accordance with one aspect, the present invention is a process amenable to low cost equipment for making liquid food products with no substantial off-flavor volatiles in a continuous process at a small as well as large scale.

In one aspect, enzymes that produce off-flavor volatiles are instantaneously inactivated thermally concomitantly with or immediately following disintegration of solid food in water while the disintegration is conducted under pressure. The pressurized disintegration permits the temperature of the resulting slurry to be raised to the desired cooking temperature, which is usually about 100° C. or above. Presence or absence of air during disintegration is relatively unimportant.

In another aspect, a system for continuously producing liquid food products with no off-flavor volatiles includes an airless grinder which is operated under pressure so that air leakage is minimized, enabling the use of low cost equipment.

In yet another aspect, the process includes both airless grinding and steam heating operations, which are performed substantially simultaneously under pressure. This simplifies the construction of a system by eliminating some of the components required in the prior art setups.

DETAILED DESCRIPTION OF PREFERRED EMBODIMENTS OF INVENTION

Figure 1:
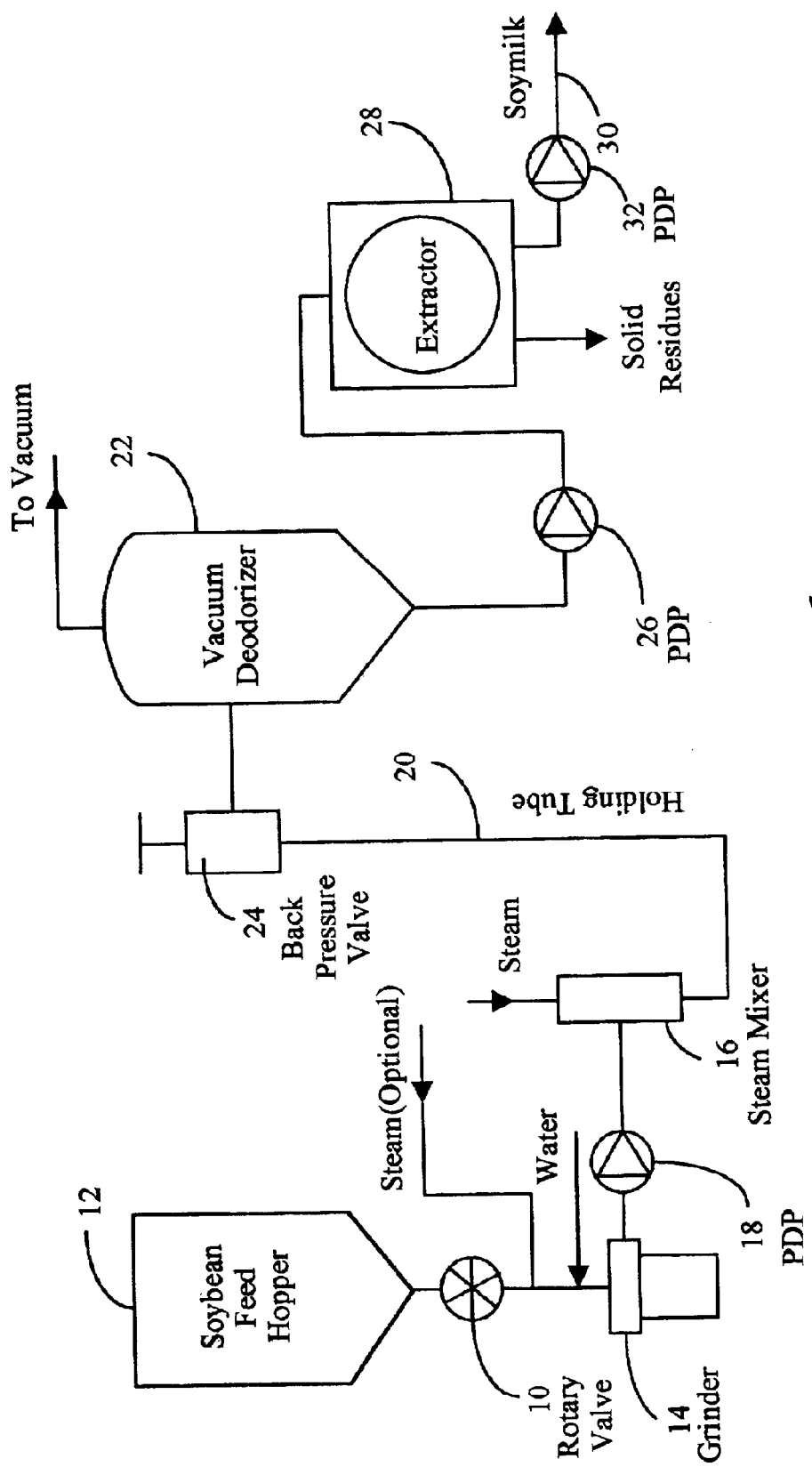
FIG. 1 is a schematic illustration of a system for continuously producing soymilk from soybeans.
Figure 2:
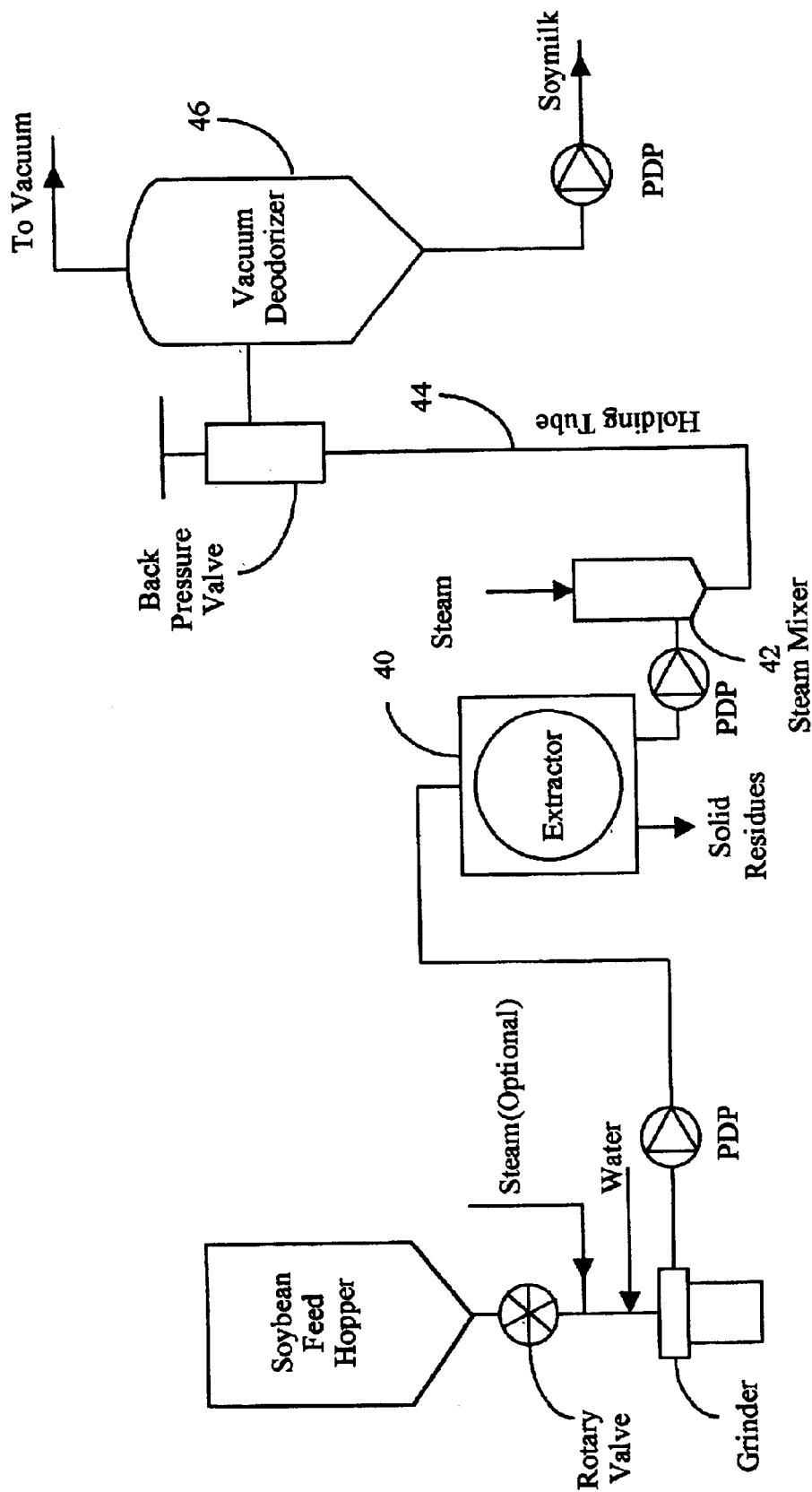
FIG. 2 is another schematic illustration of a system for continuously producing soymilk from soybeans.
Figure 3:
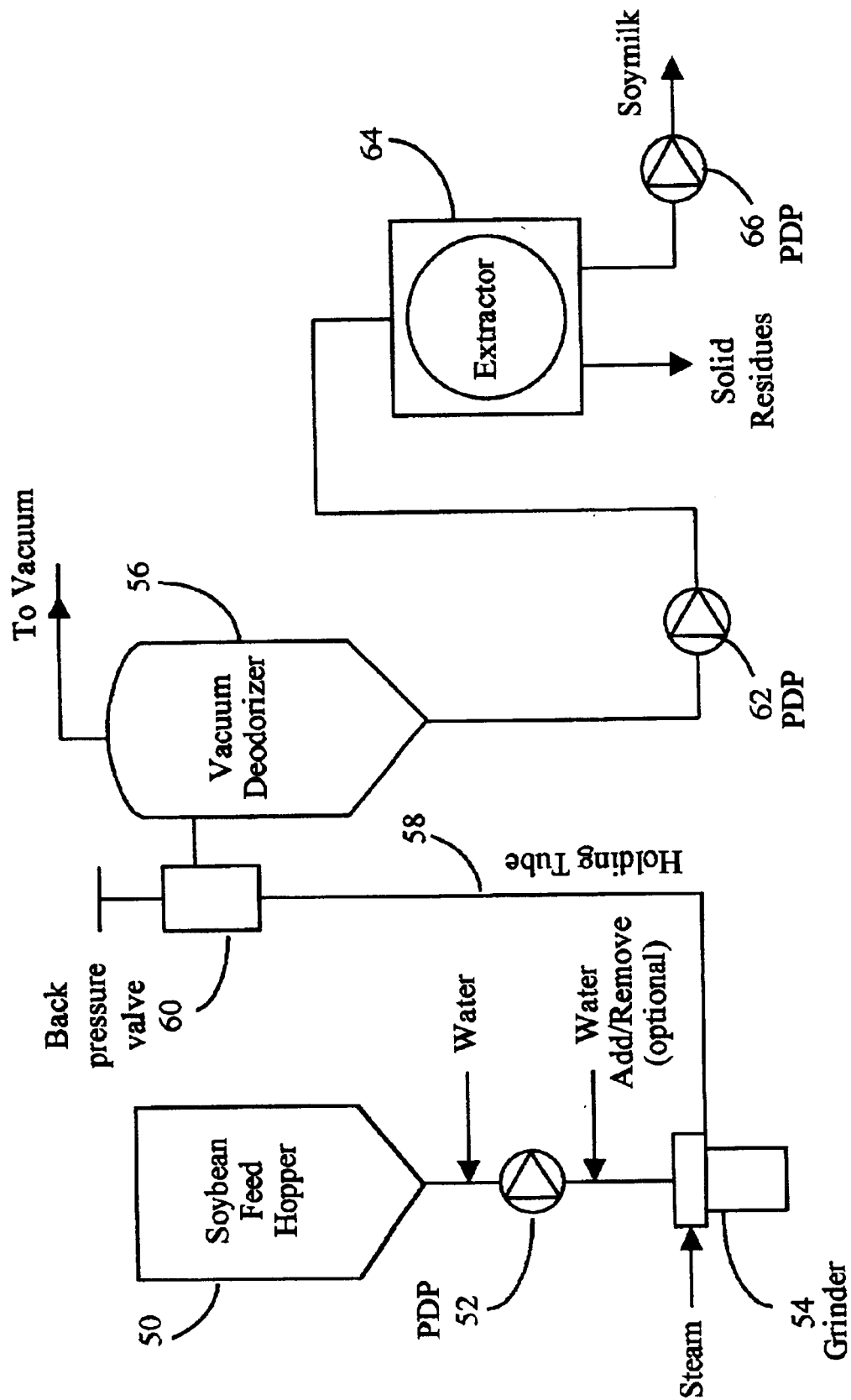
FIG. 3 is a schematic illustration of a system for continuously producing soymilk from soybeans according to one embodiment of the invention.

FIG. 3 shows schematically one embodiment of the present invention. In the figure, a soybean feed hopper 50 contains dry or properly soaked soybeans and a PDP 52 supplies regulated amount of a mixture of soybeans and water to a grinder 54 under pressure, higher than ambient pressure. Another supply of water may be provided after the PDP 52 to further regulate solid-liquid ratio. The grinder grinds soybeans to slurry under pressure. The grinder is further supplied with steam to enhance grinding as well as heating to a preset cook temperature at the same time. The heated slurry is sent to a vacuum deodorizer 56 through a holding tube 58, which maintains the slurry at the cook temperature for a preset duration of time to ensure proper cooking. A back-pressure valve 60 maintains the pressure difference between the holding tube and the vacuum deodorizer 56. The steam may be injected into the grinder: a) axially (near the inlet); or b) alternatively at the periphery of the grinder. In either way, no separate cooking element, such as a steam mixer, is needed. A PDP 62 transfer the cooked deodorized slurry to an extractor 64 for separating soymilk and the fibrous residue. Soymilk is pumped with a PDP 66.

Figure 4:
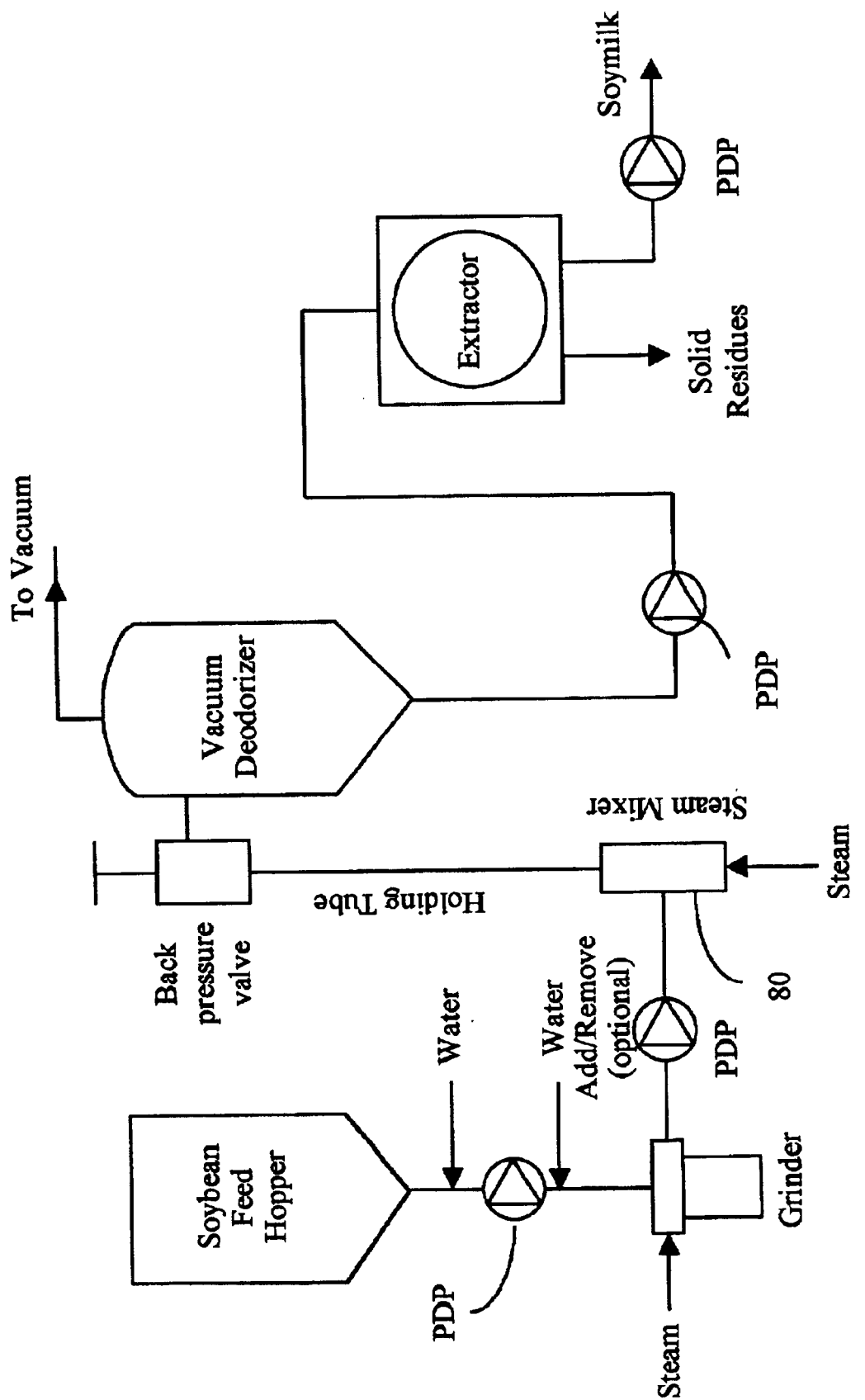
FIG. 4 is a schematic illustration of a system for continuously producing soymilk from soybeans according to another embodiment of the invention.

Of course it should be clear to those skilled in the art that a separate steam mixer 80 can be provided for any other cooking purposes as shown in FIG. 4. In FIG. 4, an optional PDP is also shown between the grinder and mixer. The extractor could also be located upstream before the vacuum deodorizer or even before the steam mixer.

As described above, in the embodiment of the present invention, soybeans are ground in a liquid, usually water or water mixed with organic and/or inorganic chemicals, under pressure and the resulting slurry is instantly heated to the cooking temperature of about 100° C. or above by injecting steam under pressure in the grinder. When grinding is under ambient pressure, the temperature is difficult to reach above 80° C., especially with hydrated beans. Since the enzyme is active up to 65° C., the operating window is only 15° C. for the so-called hot grinding methods of making soymilk. In fact some parts of the freshly ground beans in the grinder may be even below 65° C. temperature. When grinding under airless environment, which is needed to keep the enzyme dormant, strong centrifugal action of the grinder results into the creation of negative pressure around the axis of rotation of the grinder impeller, causing the suction of air into the grinder, especially from seals as they wear out.

The present invention extends the operating window of the hot grind method from about 15° C. to 35° C. or higher. For the airless grinding, it excludes the suction of air into the grinder from the inlet or from poorly designed or worn-out seals.

In addition, unit operations of grinding and steam injection are optionally combined into one operation without the problem of steam and water hammer effects. Also, the flow control and pressurization pump is moved upstream in the process line prior to the grinder which also does the job of controlling the bean feed from the feed-hopper, again combining two unit operations into one. The resulting cost saving is remarkable. Also, grinder and pumps used in the new invention can be of lower cost due to expanded operating window of the invented process.

What I claim as my invention is:

1. In the production of a liquid food product from protein containing solid food, a method of inactivating an enzyme which may produce off-flavor volatiles, comprising steps of:

maintaining a liquid and the protein containing solid food in a grinder under a pressure higher than ambient pressure;

disintegrating in the grinder the protein containing solid food in the liquid under the pressure to produce slurry, and concomitantly heating, under the pressure, the solid food in the liquid and the resulting slurry above a predetermined temperature to inactivate the enzyme.

2. The method according to claim 1, comprising a further step of raising the temperature of the solid food in the liquid and the slurry above 100° C. while disintegrating under the pressure.

3. The method according to claim 2, wherein the step of raising the temperature comprises a further step of injecting steam into the slurry while disintegrating.

4. In the production of a liquid food product from protein containing solid food, a method of inactivating an enzyme which may produce off-flavor volatiles, comprising steps of:

maintaining a liquid and the protein containing solid food in a grinder under a pressure higher than ambient pressure;

disintegrating the solid food in the liquid under the pressure under oxygen-free environment, and concomitantly heating, under the pressure, the solid food in the liquid and resulting slurry above a predetermined temperature to inactivate the enzyme.

5. The method according to claim 4, comprising a further step of raising the temperature of the slurry above 100° C. while disintegrating.

6. The method according to claim 5, wherein the step of raising the temperature comprises a further step of injecting steam into the slurry while disintegrating.

7. A process of continuously producing a liquid food product from protein containing solid food, the liquid food product having substantially no off-flavor volatiles, comprising steps of:

maintaining water and the protein containing solid food in a grinder under a pressure higher than ambient pressure;

disintegrating the solid food in water under the pressure to produce a slurry and simultaneously heating, under the pressure, the solid food in water and the slurry to a cooking temperature;

holding the slurry for further cooking under a pressure for a preset duration of time at a preset temperature;

vacuum deodorizing the cooked slurry, and extracting the liquid food product from the deodorized slurry.

8. The method according to claim 7, further comprising a step of:

raising the temperature of the solid food above 100° C. while disintegrating.

9. The process of continuously producing a liquid food product, according to claim 8, wherein the step of cooking the food slurry comprises a further step of:

injecting steam under pressure into the food slurry; and maintaining the steam/slurry mixture at a preset temperature for a preset duration of time.

10. The method according to claim 9, wherein the step of extracting is performed with a centrifugal extractor.

11. The process of continuously producing a liquid food product, according to claim 10, wherein the step of disintegrating and heating is carried out in oxygen-free environment.

12. A process of continuously producing a liquid food product from protein containing solid food, the liquid food product having substantially no off-flavor volatiles, comprising steps of:

maintaining water and the protein containing solid food in a grinder under a pressure higher than ambient pressure;

disintegrating the solid food in water under the pressure to produce a slurry and simultaneously heating, under the pressure, the solid food in water and the slurry to cooking temperature of about 100° C.;

holding the slurry for further cooking under a pressure for a preset duration of time at a preset temperature;

extracting the liquid food product from the cooked slurry; and vacuum deodorizing the liquid food product.

13. The method according to claim 12, further comprising a step of:

raising the temperature of the solid food above 100° C. while disintegrating.

14. The process of continuously producing a liquid food product, according to claim 13, wherein the step of cooking the food slurry comprises further steps of:

injecting steam under pressure into the food slurry, and maintaining the steam/slurry mixture at a preset temperature for a preset duration of time.

15. The process of continuously producing a liquid food product, according to claim 14, wherein the step of disintegrating and heating is carried out in oxygen-free environment.

* * * * *